Aug. 8, 1939.  W. N. PARMETER  2,168,491
TOURIST COOKER
Filed Dec. 24, 1937     2 Sheets-Sheet 1

Fig. 1.

Fig. 2.

Inventor
Walter N. Parmeter.
By Lacey & Lacey, Attorneys

Aug. 8, 1939.  W. N. PARMETER  2,168,491
TOURIST COOKER
Filed Dec. 24, 1937  2 Sheets-Sheet 2
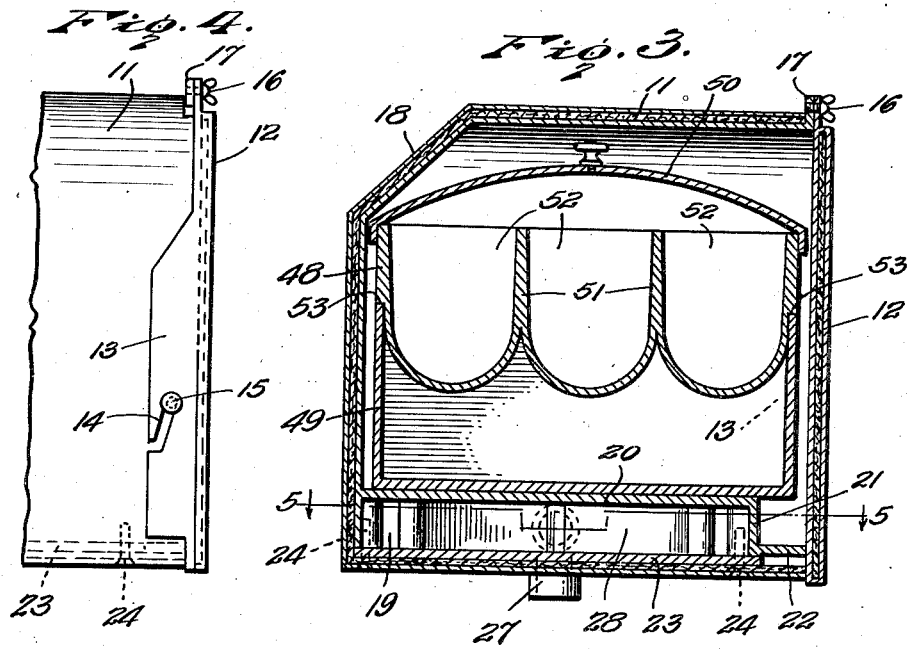
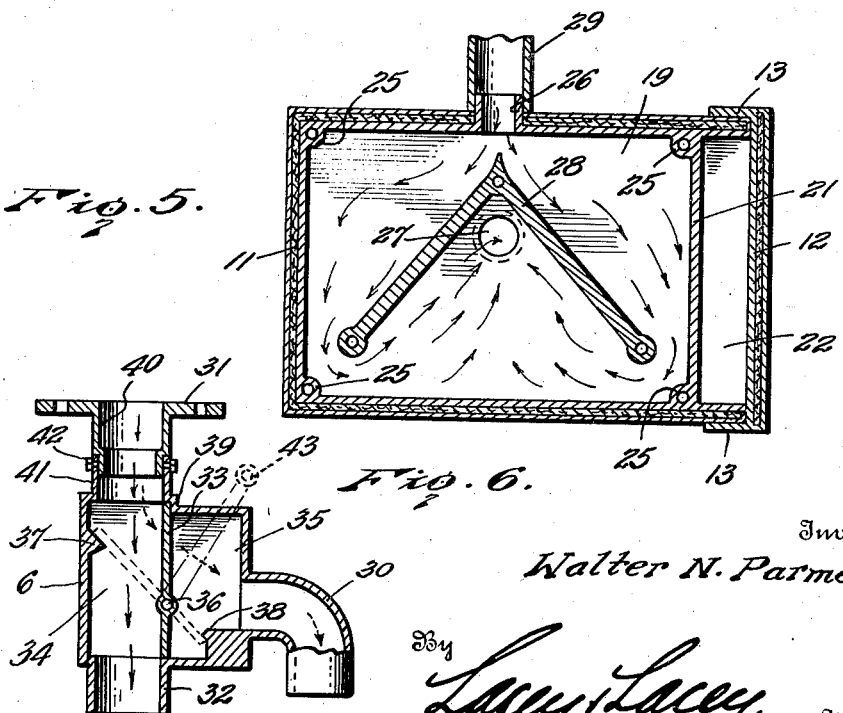
Inventor
Walter N. Parmeter.
By Lacey & Lacey,
Attorneys Patented Aug. 8, 1939

2,168,491

UNITED STATES PATENT OFFICE 2,168,491

TOURIST COOKER

Walter N. Parmeter, Canton, S. Dak., assignor of one-third to Harold Bogue, Canton, S. Dak.

Application December 24, 1937, Serial No. 181,695

4 Claims. (Cl. 126—20)

This invention relates to a tourist cooker and more particularly to a device of this character adapted to be applied as an accessory to an automobile and permit food to be cooked or kept warm while traveling from one place to another.

One object of the invention is to provide a cooker in the form of an oven so constructed that it may be mounted under a front mudguard and connected with the exhaust pipe of the engine so that the hot gases may be made use of for heating the cooker. By so mounting the cooker it will be close to the engine where the hot gases may be effectively used for heating purposes and in addition the cooker will occupy space not otherwise used and will be concealed from view and not detract from the appearance of the automobile or be in the way.

Another object of the invention is to so connect the cooker with the exhaust pipe of the engine that the hot gases may be selectively caused to either flow through the heating space of the cooker or through the exhaust pipe in the usual manner to the muffler of the automobile.

Another object of the invention is to so construct the cooker that it may be very easily opened for insertion or removal of food containers without removing the cooker from its position under the rear portion of the front mudguard.

The invention is illustrated in the accompanying drawings, wherein

Figure 1 is a side elevation of an automobile, the cooker being indicated by dotted lines under the rear portion of the front mudguard, Figure 2 is a view showing the automobile partially in elevation and partially in section and showing the cooker in place and connected with the exhaust pipe of the engine, Figure 3 is an enlarged vertical sectional view taken longitudinally through the cooker, Figure 4 is a view in side elevation of the forward portion of the cooker, Figure 5 is a sectional view taken horizontally through the lower portion of the cooker along the line 5—5 of Figure 3, and Figure 6 is an enlarged sectional view through the coupling connecting the heating pipe of the cooker with the exhaust pipe of the engine.

This improved cooker is for use as an accessory upon an automobile, a conventional form of which has been shown in Figures 1 and 2 and indicated in general by the numeral 1. The automobile is provided with the usual hood 2 at its front, under which an internal combustion engine of a conventional construction is mounted, the engine being shown in Figure 2 and indicated by the numeral 3. The engine includes the usual exhaust manifold 4 which is connected with an exhaust pipe 5 by a coupling 6 which is of a special construction and will be hereinafter specifically described. The automobile also includes the usual mudguard 7 for the front wheels 8, and the cooker, which is indicated in general by the numeral 9, is mounted under the rear portion of the mudguard at one side of the automobile and supported upon strips 10 which extend transversely of this rear portion of the mudguard and serve as braces for the same.

The cooker is illustrated in detail in Figures 3, 4 and 5. Referring to these figures, it will be seen that the casing or housing 11 of the cooker is of such dimensions that it may be disposed under the front mudguard and rest upon the supporting strips 10. The housing is open at its front, and in order to close this open front end of the housing, there has been provided a door 12 having side flanges 13 which fit against the outer surfaces of side walls of the housing and are formed with diagonally extending slots 14 to receive headed pins 15 projecting outwardly from the walls of the housing. By this arrangement the door may be slid into place and supported in position to close the open front end of the housing where it will be releasably secured by a winged screw 16 which passes through an opening formed at the top of the door and screwed into a threaded opening formed in a lug 17 rising from the top of the housing at the front thereof. The rear portion of the housing is beveled at the top, as shown at 18, in order that the cooker may be easily slid into place upon the supporting strips 10.

In order to provide a heating chamber 19 at the bottom of the housing, the bottom 20 has been disposed in spaced relation to lower edges of the walls of the housing. A depending flange or cross wall 21 extends downwardly from the bottom 20 at the front end thereof in spaced relation to the open front of the housing, and from the lower edge of this cross wall extends a bottom section or strip 22 constituting an abutment for the lower portion of the door 12 and also serving as an abutment for an edge portion of an auxiliary bottom or closure plate 23 which is secured against lower edges of the cross wall 21 and side walls of the housing by screws 24 which are passed upwardly through the closure plate and screwed into sockets 25 formed at corners of the heating chamber 19. An inlet neck 26 leads from the housing at one side of the heating chamber intermediate the length thereof and the bottom plate or closure plate 23 is formed with an outlet neck 27 disposed opposite the inlet neck. A V-shaped baffle 28 is mounted in the heating chamber, as shown in Figure 5, with the outlet 27 disposed between its intersecting ends which are directed toward the inlet neck. The arms of the baffle are of such length that they terminate adjacent front and rear ends of the heating chamber at the outer side of this chamber, and, when hot gases enter this heating chamber through the inlet neck, they must follow the path indicated by the arrows in Figure 5 in order to reach the outlet. It will thus be seen that all portions of the heating chamber will be thoroughly heated and as the bottom 20 and cross wall 21 become thoroughly heated by the hot gases the interior of the housing will also be thoroughly heated and, when food containers are placed in the housing, food therein may be cooked or kept hot as an automobile is traveling from one place to another.

The chamber 19 is to be heated by the hot exhaust gases of the engine 3, and in order that these gases may be conducted to the heating chamber, there has been provided a pipe 29 which connects the inlet neck 26 of the heating chamber with a neck or spout 30 of the coupling 6. The coupling extends vertically between the exhaust manifold and the exhaust pipe and at its upper end is formed with an outstanding annular flange 31, by means of which the coupling is connected with the rear end of the exhaust manifold. A neck 32 extends downwardly from the body portion of the coupling for connection with the forward end of the exhaust pipe. Referring particularly to Figure 6, it will be seen that a valve plate 33 is disposed vertically in the casing of the coupling to divide the same into a main passage or chamber 34 through which the exhaust gases pass to the exhaust pipe and an auxiliary chamber 35 from which the neck 30 leads. This valve plate is fixed to a rocker shaft 36 journaled transversely through the casing, and in order to limit swinging movement of the valve plate to the dotted line position, there have been provided abutments 37 and 38 for engagement by upper and lower ends of the valve plate. When the valve plate is in the position indicated by dotted lines in Figure 6, the hot exhaust gases will be directed through the neck 30 and into the pipe 29, whereas when the valve plate is in the vertical position in which its upper end engages the abutment shoulder 39, the hot gases will pass directly through the coupling and into the exhaust pipe. The neck or sleeve 40 carrying the flange 31 has a reduced lower end fitting into the neck 41 at the upper end of the coupling and set screws 42 are employed to releasably hold a reduced end of the sleeve 40 in the neck 41. It will thus be seen that the coupling can be easily removed when so desired without disconnecting the flange 31 from the flanged end of the exhaust manifold. An actuating lever 43 is carried by one end of the valve shaft 36 and to this lever is attached the forward end of a rod 44 which is slidably engaged through the instrument panel 45 and the dash 46 of the automobile and provided at its rear end with a knob 47 in order that it may be easily grasped and moved longitudinally to adjust the valve plate in the casing of the coupling.

When this cooker is in use, it is mounted upon the supporting strips 10 and the inlet neck of the heating chamber connected with the neck 30 of the coupling by the plate 29. This coupling operates the same as a manifold cut-out and, when the rod 44 is drawn rearwardly to swing the valve plate to the position indicated by dotted lines, the hot gases will travel through the pipe 29 and into the heating chamber of the cooker. As the hot gases pass through this chamber, they will serve to highly heat the bottom 20 and the cross wall 21 of the housing 11 and thus cause the interior of the housing to be highly heated. By opening the door at the front of the housing a food container may be placed within the housing where it will rest upon the bottom 20 constituting the top wall of the heating chamber and food in the container may be cooked or merely kept warm, it being understood that by properly adjusting the valve plate of the coupling the hot gases may be caused to either all pass through the heating chamber of the cooker or only a portion of the gases pass through this chamber and thus the temperature of the chamber and the interior of the housing 11 controlled.

The food container illustrated in Figure 3 has upper and lower sections 48 and 49 which may be formed of metal or any other desired material and a cover 50. The lower section 49 may have food placed therein and food also placed in the upper section which has been shown formed with partitions 51 dividing it into a plurality of food-receiving compartments 52. If so desired, water may be placed in the lower section 49 and food in the upper section in which case it will operate as a double boiler for cooking cereal and the food in the compartments of the upper section will be kept warm. An outstanding shoulder or leg 53 is formed about the upper section to rest upon the walls of the lower section. It will be obvious that, if so desired, certain articles may be cooked by merely placing them in the cooker without using the food container. In order to insert or remove the food container, it is merely necessary to turn the front wheels to a diagonal position and thus dispose the wheel in front of the cooker in such a position that insertion or removal of the food container can be easily effected after the door has been removed.

Having thus described the invention, what is claimed as new is:

1. A cooker of the character described comprising a housing open at one end and having a bottom disposed in elevated relation to lower edges of walls of the housing, a bottom plate secured to walls of the housing and together with the elevated bottom defining a heating chamber, the heating chamber having an inlet and an outlet, means in the heating chamber for directing a heating medium in a tortuous path from the inlet to the outlet, and a removable closure for the open end of the housing.

2. A cooker of the character described comprising a housing open at one end, a bottom disposed in elevated relation to lower ends of walls of the housing and having a portion extending downwardly to provide a cross wall and a bottom strip between the cross wall and the open end of the housing, a closure removably secured in closing relation to the open end of the housing, a bottom plate secured against lower edges of walls of the housing and overlapping the bottom strip along the lower edge of the cross wall and together with the cross wall and the elevated bottom of the housing defining a heating chamber, the heating chamber being formed intermediate its length with an inlet through one side and the bottom plate being formed with an outlet spaced from the inlet, and a V-shaped baffle mounted in the heating chamber with the united ends of its arm disposed between the inlet and the outlet and the other ends of its arms terminating adjacent opposite ends of the heating chamber at the opposite side thereof from the inlet whereby a heating medium entering the heating chamber through the inlet will travel in a tortuous path to reach the outlet.

3. A cooker of the character described comprising a housing open at one end and having a food receiving chamber and a heating chamber under the food receiving chamber, the heating chamber being provided with an inlet for a heating medium and an outlet, a door for closing the open end of said housing formed with side flanges for overlapping side walls of the housing and formed with slots extending at an upward incline from their rear edges, headed pins extending from side walls of the housing and engaged in said slots, a lug extending upwardly from the housing and formed with a threaded opening, and a securing screw passed through the door and screwed into the threaded opening of said lug to removably secure the door in closing relation to the open end of the housing.

4. A cooker of the character described comprising a housing open at one end, a bottom disposed in elevated relation to the lower ends of walls of the housing and having a portion extending downwardly to provide a cross wall and a bottom strip between the cross wall and the open end of the housing, a closure removably held in closing relation to the open end of the housing, a bottom plate secured against the lower edges of the walls of the housing and overlapping the bottom strip along the lower edge of the cross wall and together with the cross wall and the elevated bottom of the body defining a heating chamber, and means for conducting hot exhaust gases from the engine of the motor vehicle to the heating chamber to serve as a heating medium.

WALTER N. PARMETER.